United States Patent [19]

Lee et al.

[11] E Re. 29,417

[45] Reissued Sept. 27, 1977

[54] PAPERMAKING SYSTEM INCLUDING A FLEXIBLE CERAMIC MEMBER HAVING A PRE-LOADED TENSILE FORCE APPLYING MEANS

[75] Inventors: Charles A. Lee, Knoxville; Robert F. Hunt, Concord, both of Tenn.

[73] Assignee: International Paper Company, New York, N.Y.

[21] Appl. No.: 740,932

[22] Filed: Nov. 11, 1976

Related U.S. Patent Documents

Reissue of:

[64] Patent No.: 3,871,953
Issued: Mar. 18, 1975
Appl. No.: 455,678
Filed: Mar. 28, 1974

U.S. Applications:

[63] Continuation-in-part of Ser. No. 273,027, July 19, 1972, abandoned, Ser. No. 273,307, July 19, 1972, abandoned, and Ser. No. 377,893, July 10, 1973, abandoned.

[51] Int. Cl.[2] ..... D21F 1/48; D21G 3/00

[52] U.S. Cl. ..... 162/274; 15/256.51; 162/281; 162/352; 162/374

[58] Field of Search ..... 162/211, 274, 281, 351, 162/352, 363, 373, 374; 15/256.51; 29/452; 52/227; 138/155; 174/141 R, 141 C, 150

[56] References Cited

U.S. PATENT DOCUMENTS

| | | | |
|---|---|---|---|
| 550,281 | 11/1895 | Martin | 138/155 |
| 1,826,735 | 10/1931 | Cofrin | 162/352 |
| 2,408,176 | 9/1946 | Proulx | 162/352 |
| 3,393,123 | 7/1968 | Klinger et al. | 162/274 |
| 3,732,142 | 5/1973 | Beacom et al. | 162/374 |
| 3,778,861 | 12/1973 | Goodnow | 162/281 X |

OTHER PUBLICATIONS

Modern Ceramics, Edited by J. E. Houe and W. C. Riley, John Wiley & Sons Inc., 1965, pp. 209–214.

*Primary Examiner*—S. Leon Bashore
*Assistant Examiner*—Richard V. Fisher
*Attorney, Agent, or Firm*—Fitch, Even, Tabin & Luedeka

[57] ABSTRACT

A system for use in papermaking including at least two members one of which is movable relative to the other and in frictional engagement therewith wherein at least one of the members comprises an elongated flexible composite including a plurality of ceramic segments, each segment having at least two opposite surfaces that are flat and parallel. The segments are aligned in stacked relationship with their flat faces in abutting face-to-face relation and forced toward each other in the direction of their composite length with a force which is sufficient to maintain the segments in compression when subjected to conditions of thermal change and/or flexing of the member during use. The ceramic member is provided with a smooth elongated working surface which defines an area of contact between the members of the system. Systems including a papermaking foil or suction device in a papermaking process, or a doctor blade are disclosed. A method for making the ceramic member is disclosed.

13 Claims, 15 Drawing Figures

PAPERMAKING SYSTEM INCLUDING A FLEXIBLE CERAMIC MEMBER HAVING A PRE-LOADED TENSILE FORCE APPLYING MEANS

Matter enclosed in heavy brackets [ ] appears in the original patent but forms no part of this reissue specification; matter printed in italics indicates the additions made by reissue.

This application is a continuation-in-part of Ser. Nos. 273,027 filed July 19, 1972; 273,307, filed July 19, 1972; and 377,893, filed 10, 1973, all now abandoned. Further, this application is related to Ser. No. 377,894, filed July 10, 1973, *now U.S. Pat. No. 3,869,344.*

This invention relates to papermaking systems including two members that are movable relative to one another, and more particularly to a wear-resistant, flexible member which is useful in applications where the member is to be subjected to conditions of thermal change and/or forces tending to bend the member along its length.

The physical properties and/or the chemical inertness of ceramic materials frequently suggest such materials for use in applications wherein the material is to be subjected to potential physical and/or chemical degradation as by frictional forces, corrosion, or other erosive forces. Not infrequently, ceramic elements or members are of considerable length and subjected to thermal change or forces, such as vibration or frictional drag, which tend to bend or deflect the member along its longitudinal axis.

Because of the relatively high cost and difficulty of manufacturing ceramic members in continuous lengths, for example lengths greater than about two feet, ceramic materials have heretofore been generally limited to use in those situations where their relatively high cost is justified in order to obtain the advantages from the physical and/or chemical properties of the ceramic materials. Even in such special situations where ceramic lengths have been employed, it has been important to assure that the elongated ceramic members neither bend nor are subjected to localized stresses, so as to avoid cracking and/or breaking of the elongated member. Consequently, the circumstances under which elongated ceramic members could be used heretofore have been severely limited.

Commonly in papermaking systems, there are two members, one of which is movable relative to the other and in frictional engagement therewith. In these systems, at least one of the members will possess a working or wear surface defining an area of contact between the members. Examples of such systems include the combination of elongated drainage devices, such as foils or suction boxes, in contact with a forming fabric in a Fourdrinier papermaking machine, a Uhle Box which bears against a forming fabric or felt in a papermaking machine, and doctor blades for use in contact with rotating drums or other moving members. In these systems, the member having the wear surface frequently is of elongated geometry and has a length as great as 20 to 30 feet, or greater.

In papermaking machines, e.g. a Fourdrinier machine, a twin wire machine, or the like, a dilute slurry of wood fibers in a water medium is deposited on a moving screen known in the art as a wire. Water drains and/or is withdrawn from the slurry and through the openings in the wire to produce a self-sustaining paper web. These wires may be made of a metal or plastic as known in the art.

Various drainage devices have been employed heretofore for aiding withdrawal of water from the slurry by developing suction on that side of the wire opposite the slurry carried thereon. Foils are among such devices. The usual foil comprises an elongated member, which may be 20 or more feet long, that extends transversely of the direction of travel of the wire and serves to support the moving wire incident to its water removal function. The usual foil is stationarily mounted beneath the wire by means of a support structure, each end of which is mounted on the papermaking machine, so that the foil and its support structure is self-supporting along that portion of its length between the end supports. At least one of the end mountings provides for expansion and contraction of the foil and its support structure as their lengths change due to temperature changes as is known in the art.

Foils usually are provided with a top surface having a leading edge (facing the inlet end of the papermaking machine) which scraps water from the bottom surface of the wire, a substantially flat portion which contacts and supports the moving wire, and a trailing portion that diverges downwardly away from the wire. The action of the wire moving over and past the trailing portion develops a reduced pressure in the area between the wire and the trailing portion that functions to pull water from the slurry through the wire. When the foil is geometrically uniform and free of gaps, cracks or the like along its length, there is an evenly distributed and generally uniform suction developed along the length of the coil and a uniform withdrawal of water from the slurry. This aids in producing a paper web of uniform quality.

It shall be recognized that there is significant frictional engagement between the wire and the foil or supporting structure as the wire moves over the foil. This frictional contact between the wire and the foil is in part due to the suction pulling the wire against the foil. These frictional and hydraulic drag forces increase the wear of both the wire and foil. These forces are aggravated by hydraulic drag forces arising by reason of water on the surface of the fast moving wire impacting the leading edge of the foil. These latter forces and the frictional forces are sufficient in magnitude to cause the foil to flex along its length, the direction of such flexing being in the direction of movement of the wire across the foil, i.e. the machine direction. When installing a foil on a papermaking machine, it is not uncommon that the foil be adjusted with respect to the papermaking machine superstructure so as to align the foil with the wire. This may involve the addition of shims which bring the foil into the desired alignment, involving flexing of the foil.

In some instances, the wires in papermaking machines are supported by elongated devices disposed beneath and transversely of the direction of movement of the wire. Such devices do not necessarily aid in withdrawing water from the slurry through the wire but are subject to the wear and flexing problems as are foils. Metal foils, as introduced to the industry, proved unsatisfactory due to excessive wear of both the foil and the wire. It was subsequently suggested that the metal be hardened or that ceramic inserts to provided in strategic locations of the foil. Neither of these concepts provided a sufficiently smooth surface so that the wire was worn excessively. It has also been suggested heretofore that hard, dense ceramic materials be used in drainage devices for papermaking machines. These problems relate to the present incapability of the industry to fabricate ceramic foils of the required size. In view of the limitations of the industry, it has been suggested heretofore that drainage devices for papermaking machines be made of multiple segments of ceramic materials. Ceramic materials in continuous lengths are economically prohibitive to manufacture and very susceptible to fracture. Insofar as the use of ceramic segments in drainage devices is taught in the prior art, the concepts are not acceptable for the reason that the segments separate from each other when the device deflects or is subjected to thermal change thereby opening up gaps or cracks between adjacent segments with resultant nonuniformity of paper quality.

In the usual Fourdrinier papermaking machine, the wet paper web passes from the wire section to the press section for further water removal. The transfer of the wet paper web from the wire section to the press section is frequently accomplished by means of a felt. The paper web, while on the felt, is passed through the press section where additional free water is removed from the paper web through the use of various combinations of pressure and suction. Following the pressing of the paper web, it is separated from the felt and passed to further processing stations. The felt normally comprises an endless fabric so that as it is separated from the paper web following pressing, the fabric is caused to traverse several return rolls to be directed back to the point where the wet paper web coming from the wire section is received on the felt.

During the time that the paper web is present on the felt and water is being removed from the paper web through the felt, the pores in the felt become plugged by such materials as rosin, clay, starch, paper fines, bacterial products and so forth. Also, as the felt passes through the presses, its bulkiness is reduced. To assure uniform porosity of the felt, hence uniform water removal from the wet paper web, it is desired that the felt be cleaned on its return run. Such cleaning is commonly accomplished by suction box devices over which the felt is caused to move during its return run. The suction developed by such box restores the bulkiness of the felt as well as cleaning and drying the felt. Suction boxes of this type are also useful in the wet end of a Fourdrinier papermaking machine where they are positioned beneath the wire to aid in withdrawing water from the paper slurry carried by the wire. For purposes of this disclosure, the term "fabric" is considered to include felts and/or wires.

In one common suction box of the type used for cleaning felts, there is provided an elongated slot which extends the width of the felt so that as the felt moves transversely across the slot, the desired cleaning and renewal of the felt is brought about. In an effort to reduce the wear on the felt and those portions of the suction box which are contacted by the felt, particularly the edges of the slot in the suction box, it has been proposed that the slot edges be provided with ceramic faces, comprising continuous lengths of ceramic material or adjacent ceramic segments in side-by-side relation, which provide a smooth, hard and long wearing surface in contact with the felt.

For reasons of economy, only those portions of these and other suction box drainage devices in contact with the felt or wire are made of ceramic material. The remainder of the box is made of materials that are less expensive and less costly to fabricate, such other materials, stainless steel for example, providing support for the ceramic portions which are securely mounted thereon. As noted above, inasmuch as the ceramic and nonceramic materials have different coefficients of thermal expansion, in the instance of the prior art devices having ceramic sections in side-by-side relation along the edges of the box slot, the thermal changes normally encountered in papermaking machines cause the support to expand to a greater degree than the ceramic so that the ceramic segments no longer remain in abutting relation and become free to physicaly separate. Such physical separation produces gaps in the surface of the box over which the felt or wire moves which cause irregular patterns of air or water flow that manifest themselves in similar irregularities in the felt surface or in the paper web formed on the wire. Further, the edges of the gaps between stress or wear points that cause inordinate wear of the felt or wire.

In the instance of continuous lengths of ceramic materials provided along the edges of the box slot, frictional and/or hydraulic drag forces arising by reason of the felt or wire moving across the box flex the box along its longitudinal axis and cause the continuous lengths of ceramic to crack or break transversely thereof. This develops the undesirable gaps and/or points of wear referred to above so that these prior art devices also are unsuitable.

Still further, in certain papermaking systems the paper web from the press section is fed over a cylindrical dryer such as the well-known Yankee Dryer for further drying of the web. In these systems the web is trained about a portion of the peripheral surface of the dryer and dried by heat transferred through the cylindrical shell thereof. Steam introduced into the interior of the dryer shell is commonly used to heat the shell. The dry paper web is doctored from the shell by means of a doctor blade comprising an elongated blade member extending transversly of the direction of the rotation of the dryer and frequenctly in contact with the exterior cylindrical surface of the dryer along a line extending across the dryer surface substantially parallel to the rotational axis of the dryer. In operation of these dryers, the surface of the dryer shell becomes irregular due to it being heated by the steam. In order to keep the doctor blade in contact with the shell for doctoring the web from the shell, it is necessary to bend the doctor blade so that if conforms to the irregularities from the shell surface. In this and other systems of this type, it is desired that the elongated blade member be flexible and have a good wear surface.

It is therefore an object of the present invention to provide an elongated flexible ceramic member useful in a papermaking system. It is also an object of this invention to provide an elongated flexible ceramic member of substantial length wherein the member comprises a plurality of ceramic segments adapted to accommodate conditions of thermal change or bending of the member within predetermined limits. Another object of this invention is to provide a method for the manufacture of an elongated flexible ceramic member.

It is also an object of this invention to provide a papermaking system comprising at least two members one of which is movable with respect to the other and in frictional engagement therewith and one of which is an elongated flexible ceramic member.

It is also an object of the present invention to provide a flexible foil or like elongated supporting structure for the wire of a papermaking machine which affords the advantages of having a hard, long-wearing, smooth surface in contact with the wire. It is also an object of this invention to provide a foil including ceramic material at least in the wire-contacting portion thereof, it is another object of this invention to provide a foil including a plurality of ceramic segments disposed in face-to-face relation to define an elongated foil which is relatively flexible along its longitudinal axis and wherein gaps do not develop between the faces of adjacent ceramic segments when the foil is subjected to thermal change or bending movements.

It is also an object of the present invention to provide a slotted drainage device, particularly useful in a papermaking machine, over which the felt or wire of a papermaking machine passes transversly thereof, wherein the longitudinal edges of the slot each include a plurality of ceramic segments disposed in face-to-face relation.

Other objects and advantages of the invention will be recognized from the following description and claims, including the drawings in which:

Figure 1:
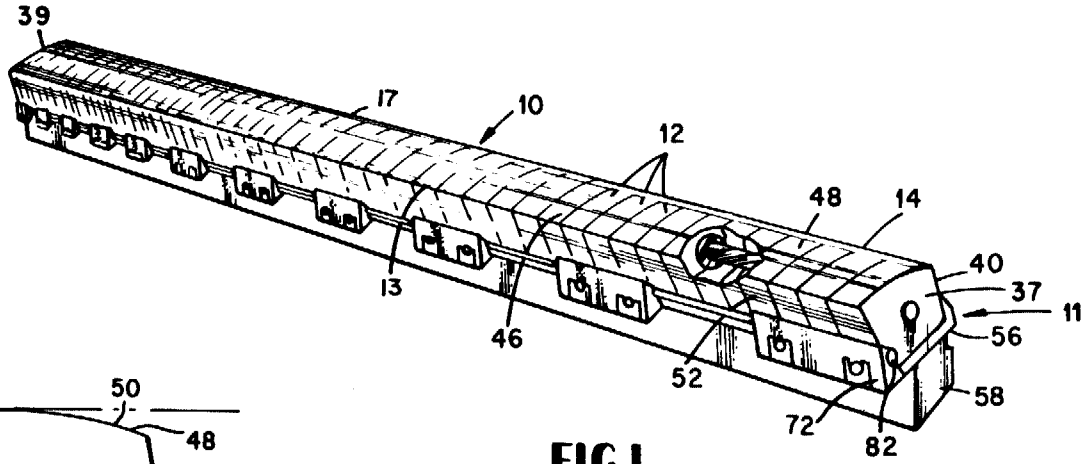
FIG. 1 is a representation, in perspective and partly cut-away, of a foil embodying various features of the invention.
Figure 2:
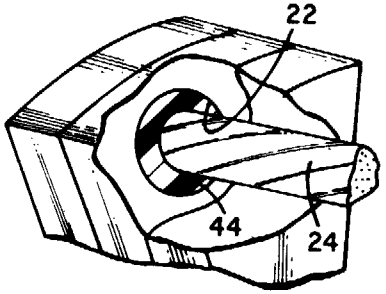
FIG. 2 is an enlarged fragmentary view, part in section, showing a portion of the foil of FIG. 1.

In accordance with the present disclosure, there is provided a system that includes two relatively movable members, one of which comprises an elongated ceramic composite. The ceramic member is formed from a plurality of segments, each having opposite flat faces that are aligned with their flat faces in abutting face-to-face relation, the segements being held in their abutting relation by tension means which maintains the segments in compression such that the abutting segment faces do not separate and form a gap or gaps therebetween when the member is subjected to flexing forces or to thermal change.

FIGS. 1-5 depict a system including a foil 10 positioned transversely of and in contact with the wire 15 of a papermaking machine which moves thereacross with the front edge 13 of the foil in contact with the wire. The foil includes a trailing edge 17 which diverges from the wire to form an acute angle therebetween. It has been found that the foil can be provided with the desirable wear characteristics of a ceramic material and also be made sufficiently flexible to enable the foil to withstand the maximum deflection of the foil anticipated in a papermaking machine. In the present disclosure, the specific reference is not to be considered as limiting the invention but it is recognized that the disclosed concepts are applicable to relate or similar two-member systems.

The illustrated foil 10 comprises a support structure 11 on which there is mounted an assemblage 14 of ceramic segments or wafers 12, each being of generally rectangular geometry and having two opposite parallel faces 16 and 18. The segments are disposed in face-to-face relation with their parallel faces abutting the parallel faces of adjacent segments to define an elongated assemblage 14 of a length sufficient to extend fully across the width of the wire 15 moving across the foil. As will appear hereinafter, the abutting faces of adjacent segments are subjected to a compressive force applied at substantially right angles to the faces. To prevent cracking or breaking of the segments due to unevenly applied stresses, the faces 16 and 18 are each substantially flat and are oriented substantially parallel to each other and substantially perpendicular to the longitudinal axis of the assemblage 14. Each of the parallel faces is flat and smooth to within less than about 20 microinches (AA) so that when the individual segments are placed in face-to-face relation, the abutting flat faces of adjacent segments lie in contact with each other over substantially the entire areas of the abutting faces without significant open space therebetween. An opening 20 extending between the opposite flat faces 16 and 18 of each segment is aligned with similar openings of the abutting segments to provide a channel 22 through the assemblage.

Each illustrated segment further includes a flat top surface 26, a flat bottom surface 28, and forward and rear surfaces 30 and 32, respectively. The forward surface 30 extends upwardly from the bottom surface 28 to join the forward edge of the top surface 26 and define an acutely angled leading edge 34. As indicated, the top surface 26 of each segment is flat. The rear edge of such flat surface 26 transists into a diverging trailing surface 36. In the illustrated segments, the trailing surface 36 is generally arcuate to provide an increasingly greater acute angle between the trailing surface 36 and the Fourdrinier wire 15 passing over the foil (see FIG. 3). It may be desired in certain applications to not use the foil in withdrawing water, in which case the entire top surface of each segment may be flat. Alternatively, the trailing surface 36, itself, may be substantially flat so as to form a constant angle with the wire.

In producing a foil of given length, a sufficient number of segments 12 are assembled in face-to-face relation with their respective openings 20 aligned to obtain the desired foil length. The assembled segments are secured together with a force applied substantially in the direction of the length of the assemblage 14 and substantially perpendicular to the flat parallel faces of the segments. This force is sufficient to place the segments in elastic compression and is suitably applied as by a tension means applying a compressive force to opposite ends 37 and 39 of the assemblage 14. One suitable tension means is a cable 24 inserted through the aligned openings 20 of the assembled segments, pulled to the required length, anchored at the opposite ends of the assemblage as by swage fittings 41, and released to exert a compressive force to the assemblage at its opposite ends. Alternatively, other tension means may be used to establish the desired compression of the segments in the assemblage. One such other means includes a rod disposed in the aligned openings 20 of the segments and fitted with a nut at one or both of its ends so that tightening of the nuts tensions the rod and places the segments in compression. One suitable cable for applying the desired compression force to the segments is made of carbon steel and of the general type employed in prestressed concrete structures.

The cable 24 may be chosen with a diametral dimension less than the diametral dimension of the opening 20 in each segment and after the segment is in place on the cable the space between the cable and the inside surface of the opening 20 in the segment may be filled with a grout 44, such as rigid polyurethane, to position the cable within the openings 20 and provide added assurance that the segments do not rotate about the cable and that the faces of adjacent segments remain flush with each other. One suitable grout is a liquid casting urethane polymer designated as LD-2699, sold by E. I. Du Pont de Nemours Company, Trenton, N.J. This grout also accommodates the axial movement of the segments with respect to the compression cable during compression of the stacked array.

In one embodiment, the assemblage of segments is provided with a plate or other means such as a metallic segment 40 at each end of the assemblage to provide for distribution of the compressive force over the face of each end segment to protect it from destruction by localized forces. A plurality of tension means may be employed to force the segments into the desired compression and in those instances where the desired compression is relatively great, such provide greater compression capability. Multiple, spaced apart, tension means also aid in more evenly distributing the compressive forces over the abutting faces of the segments.

In the assemblage 14 of segments, the individual segments 12 are oriented with respect to each other in a manner such that their common surfaces lie in common planes to combine with each other to define an elongated substantially flat top surface 46 extending along the length of the foil and adapted to contact and support a Fourdriner wire 15 moving thereacross. The combined aligned faces also define an elongated trailing surface 48 which is a continuation of the flat surface 46 but diverges downwardly away from the wire 15 to define a generally triangular (cross-section) zone 50 between the trailing surface 48 and the Fourdrinier wire 15. It is in this zone 50 that the usual relatively low pressure is developed which assists withdrawal of water from a slurry of paper fibers carried on the wire. The elongated assemblage 14 of ceramic segments further includes an inclined forward surface 52, defined by the combined forward faces of the segments, that joins the forward edge of the flat top surface 46 to define an acutely angled leading edge 13 extending the length of the foil and which functions to scrape water from the wire as it moves past the stationary foil. Alignment of the segments so that their common surfaces combine to provide the described foil surfaces is accomplished during assembly.

In the illustrated foil 10, the stack 14 of ceramic segments 12 is mounted in a support saddle 56 which in turn is mounted on existing superstructure of a usual Fourdriner papermaking machine (not shown). Such papermaking machines, their structure and operation, are well known in the art and need not be discussed herein. Preferably, the support saddle 56 is removably secured in position on the papermaking machine as by means of bolts 60 that join the support saddle at spaced apart locations to an elongated bar 58 that extends between opposite sides of the papermaking machine and which is itself secured at its opposite ends to the papermaking machine. The support saddle 56 and the bar 58, being securely joined to each other at relatively closely spaced points, exhibit thermal expansion characteristics that are some combination of the individual thermal characteristics of the saddle 56 and bar 58. It will be recognized that if the saddle and bar are of the same material, they will exhibit the thermal expansion characteristic of such material.

The support saddle 56, in the illustrated foil, includes an elongated bottom portion 82 in FIG. 1 which resides on and is bolted to the bar 58 to join the saddle to the bar referred to above. A rear wall portion 64, formed integrally with the bottom portion, extends upwardly from the bottom portion 62 of the saddle. The upper surface 66 of the bottom section 62 and the forward surface 68 of the rear wall 64 receives the bottom surfaces 28 and at least a portion of the rear surfaces 32 of the stacked segments to provide support for the segments and position them for engagement with the wire 15. At the juncture of its surface 66 and its surface 68, the support saddle is cut away along its length to accommodate the bottom rear corners 70 of the segments. In the illustrated support saddle, these surfaces 66 and 68 define an acute angle therebetween into which the corners 70 of the segments fit thereby restraining the segments against upward movement out of the support saddle. Further support and retention of the segments in the saddle 56 is provided by a plurality of clamps 72 that are removably attached as by bolts 74 to the bottom portion 62 of the saddle at locations spaced along the length of the foil. A generally semicircular (cross-section) groove 76 extending parallel to the longitudinal axis of the foil is provided on that face 78 of the clamp next to the segments. A similar groove 80 is provided on the forward face of each segment so that the two grooves define a generally circular channel between each clamp and the segments faced by the clamp. A relatively non-yielding cylindrical rod 82 is fitted into the channel defined by the grooves 76 and 80 to prevent movement of the segments with respect to the clamps 72 and thereby hold the segments in position in the saddle 56.

A further system including a drainage device specifically a Uhle box), for papermaking is shown in FIGS. 6–10 and this system comprises a suction box having a longitudinal slot 100 whose longitudinal side edges each comprise a plurality of ceramic segments 102 disposed in face-to-face relationship and held together in an assemblage 104 in the direction of their composite length with a force sufficient to hold the segments in elastic compression to the degree sufficient to accommodate anticipated thermal change and/or flexing without physical separation of the segments. This is accomplished by forming the side edges of the slot 102 in the suction box 106, from the respective assemblages 104 and 104', each of relatively thin ceramic segments 102 held together by means of a nonceramic tension means 120 with a compressive force applied in the direction of their composite length.

Various drainage device, e.g., Uhle boxes, suction boxes, etc. may be supplied with ceramic edges along the sides of the slot therein as disclosed herein. For simplifying the present disclosure, the discussion at times refers to a suction box, but such is not to be deemed to limit the invention.

With reference to FIGS. 6–10, in one embodiment the suction box 106 includes a generally elongated tubular housing 108 having a slot 109 cut in one of its walls 110 so that the slot opens facing a felt 112 or the like which moves transversely over the slot. Each of the longitudinal side edges of the slot 100 comprises an assemblage 104 including a plurality of ceramic segments 102 held in face-to-face relation to provide ceramic surfaces 114 and 116 in contact with the felt 112. Each of the ends of the box is closed as by a plate 118, at least one of which has an outlet conduit 122 leading to a source of suction (not shown) by means of which a vacuum is developed within the box. The two assemblages 104 and 104' of ceramic segments face each other and define an extension of the slot 109 in the box. As desired, each end portion 124 of the slot 100 may be sealed as by means of a deckle 126 whose construction and function is known in the art.

The suction box 106 is supported at its opposite ends on exiting papermaking machine superstructure 128, the box being disposed on one side of the felt with the felt bearing against the ceramic surfaces as it moves transversely over the box. The vacuum developed within the box pulls water and other material, such as felt contaminates, from the felt.

It will be recognized that the suction developed within the box pulls the felt against the ceramic surfaces 114 and 116 thereby increasing the frictional drag of the felt against the box. These frictional forces are aggravated by hydraulic drag forces such as are developed by water droplets on the the fast moving felt or wire impinging the leading edge of the box. Such friction and hydraulic drag forces bend the box along its longitudinal axis in the direction of felt or wire travel.

As noted, the suction box is subject to exposure to thermal changes such as may occur during shipment or storage, as well as the difference in the temperature of the box at the time it is installed on the papermaking machine and its temperature when the papermaking machine reaches its operating temperature.

In the illustrated suction box 106 each of the assemblages 104 and 104' comprises a plurality of ceramic segments or wafers 102, each being generally disc-shaped and having two opposite parallel faces 130 and 132. The segments are disposed in face-to-face relation with their parallel faces abutting the parallel faces of adjacent segments to define the elongated assemblage 104, the number of segments in the assemblage being sufficient to provide a length sufficient to extend fully across the width of a felt 112 moving across the box. Abutting adjacent segments are subjected to a compressive force applied at substantially right angles to their parallel faces. To prevent cracking or breaking of the segments due to unevenly applied stresses, the faces 130 and 132 are each substantially flat and are oriented substantially parallel to each other and substantially perpendicular to the longitudinal axis of the assemblage 104. Each of the parallel faces is flat and smooth to within less than about 20 microinches so that when the individual segments are placed in face-to-face relation, the abutting flat faces of adjacent segments lie in contact with each other over substantially the entire areas of the abutting faces without significant open spaced therebetween. An opening 134 extending between the opposite flat faces 130 and 132 of each segment is aligned with similar openings of the abutting segments to provide a channel through the assemblage.

The ceramic composite of this embodiment is produced in like manner as the foil referred to hereinbefore, that is a sufficient number of segments 102 are assembled in face-to-face relation with their respective openings 134 aligned to obtain the desired length. The assembled segments are secured together with a force applied substantially in the direction of the length of the assemblage 104 and substantially perpendicular to the flat parallel faces of the segments. This force is sufficient to place the segments in elastic compression and is suitably applied as by a tension means applying a compressive force to opposite ends 136 and 138 of the assemblage 104. The two assemblages 104 and 104' are substantially identical. One suitable tension means is a cable 140 inserted through the aligned openings 134 of the assembled segments, pulled to the required length, anchored at the opposite ends of the assemblage as by swage fittings 142, and released to exert a compressive force to the assemblage at its opposite ends. Alternatively, other tension means may be used to establish the desired compression of the segments in the assemblage. One such other means includes a rod disposed in the aligned openings 134 of the segments and fitted with a nut at one or both of its ends so that tightening of the nuts tensions the rod and places the segments in compression. One suitable cable for applying the desired compression force to the segments is made of carbon steel and of the general type employed in prestressed concrete structures.

The cable 140 may be chosen with a diametral dimension less than the diametral dimension of the opening 134 in each segment and after the segment is in place on the cable the space between the cable and the inside surface of the opening 134 in the segment may be filled with a grout 144, such as rigid polyurethane, as described hereinbefore. The end segments may be protected from localized forces by a plate or metallic segment 146, and plural tension means may be employed as previously described.

Figures 4, 5, 6:
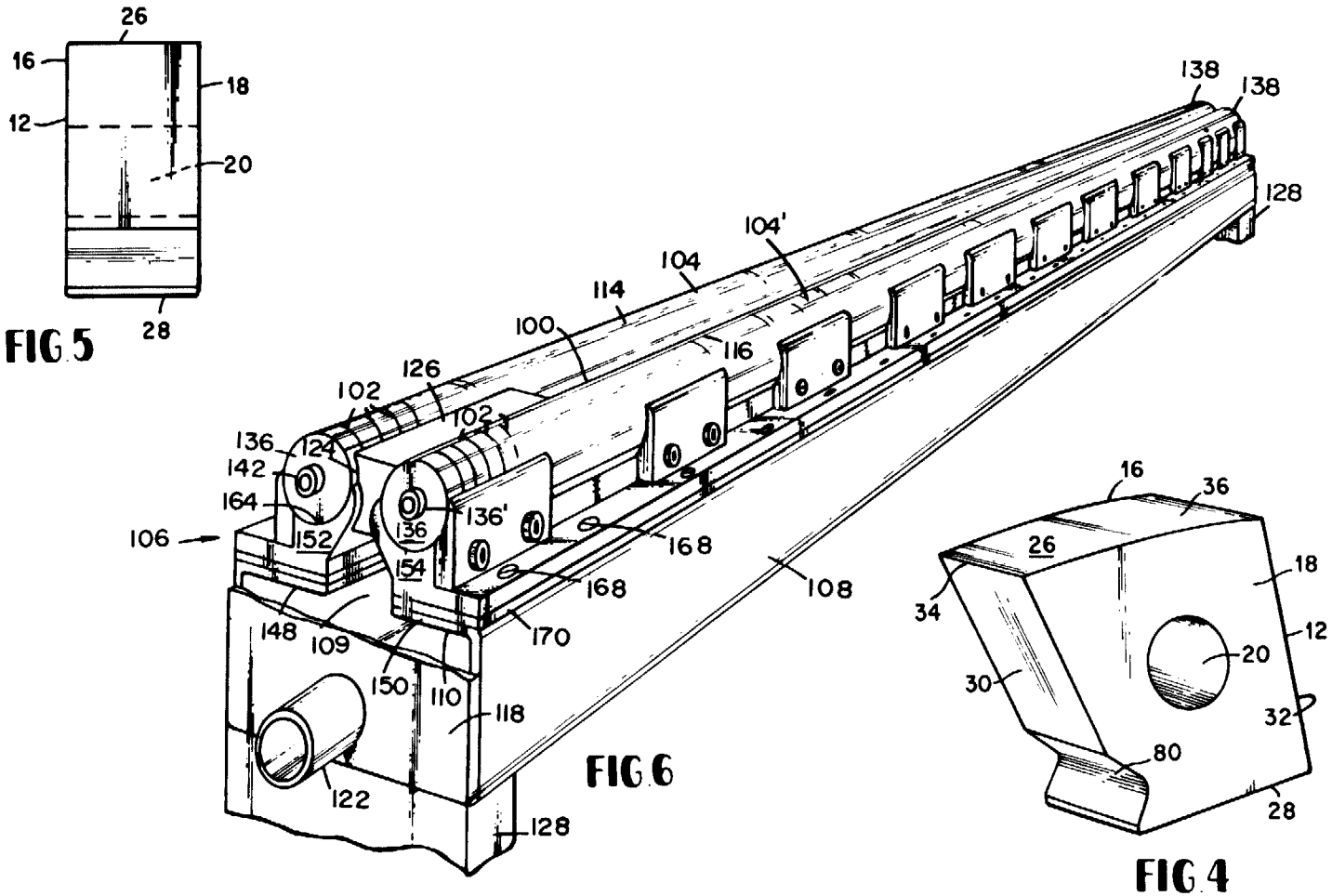
FIG. 4 is a representation of a segment of the foil shown in FIG. 1.
FIG. 5 is a front view of the segment shown in FIG. 4.
FIG. 6 is a representation, part in section of a slotted drainage device embodying various features of the invention.
Figure 7:
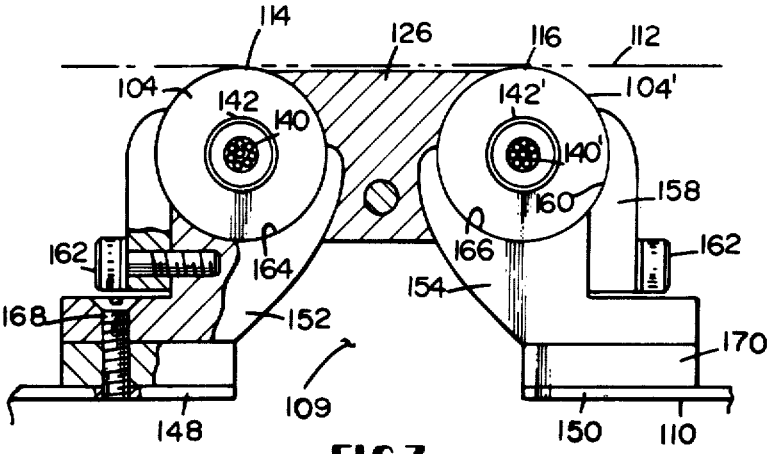
FIG. 7 is an end view, part in section, of the drainage device of FIG. 6.
Figure 8:
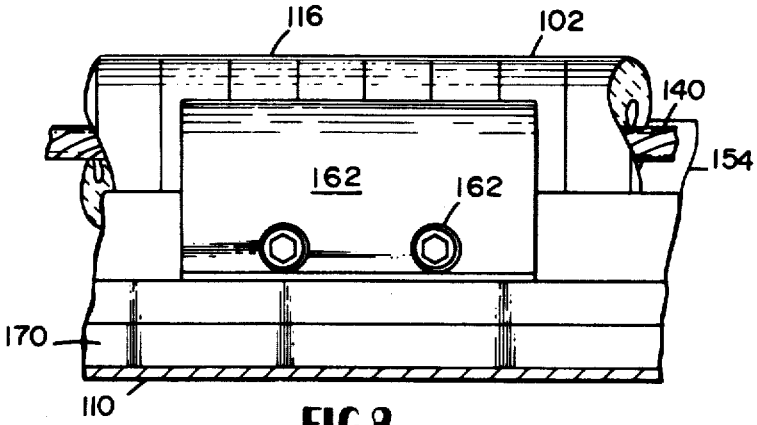
FIG. 8 is a fragmentary side view of the drainage device of FIG. 6.
Figure 9:
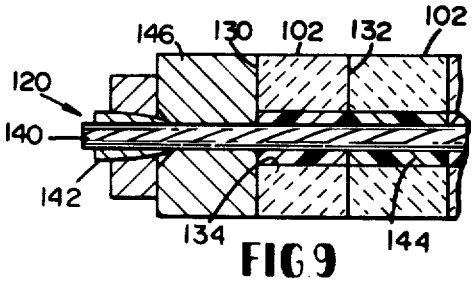
FIG. 9 is a fragmentary side view of an assemblage of ceramic segments as disclosed herein; and, FIG. 10 is a fragmentary representation of a support cradle for an assemblage of ceramic segments as disclosed herein.
Figure 10:
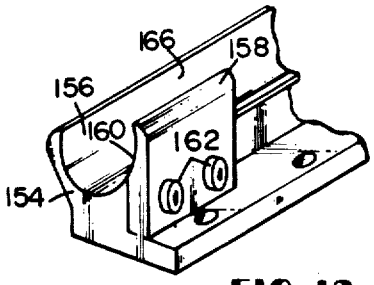

In the assemblage 104 of segments, the individual segments 102 are aligned with respect to each other in a manner such that their peripheries are flush with each other to define an elongated top surface 114 extending along the length of the box and adapted to contact and support a drier felt or Fourdrinier wire moving thereacross. Employing centerless grinding techniques, the aligned peripheries of the segments are provided with a collective smooth surface finish of less than about 20 microinches AA (arithmetic average) so as to provide for low frictional contact between the ceramic surfaces 114 and 116 and the felt 112. In this manner, the wear of the ceramic surfaces and the felt is minimized. It has also been found that less horsepower is required to move the felt over the disclosed ceramic surfaces than has heretofore been required with accompanying savings in power. In the depicted suction box, the assemblages 104 and 104' of compressed ceramic segments are mounted on ledges 148 and 150 of the upper wall 110 of the suction box 106. One suitable mounting is depicted in FIGS. 6 and 10 and comprises elongated cradles 152 and 154, one on each side of the slot 100. Each of the depicted cradles includes a first continuous length clamp 156 extending over substantially the entire length of the side edge of the slot 100 and shaped to receive an assemblage of segments 104' therein. The fit between each continuous clamp and its assemblage of segments along the length of the clamp is sufficient to form a vacuum seal therebetween. If necessary or desired a gasket may be employed between each assemblage and its respective cradle. The assemblage 104 is retained in its continuous clamp 156 means of a plurality of further clamps 158 each having a concave face 160 contacting the assemblage and being removably secured to the continuous clamp as by means of bolts 162. In addition to holding the assemblage in place, these further clamps 158 force the assemblage against the continuous length clamp 154 to aid in developing and maintaining a vacuum seal between the assemblage.

The continuous surfaces 164 and 166 of the clamps 152 and 154 are disposed facing each other to define an elongated extension of the slot 100 so that fluid or other matter withdrawn from the felt or wire is directed into the suction box to be discharged through the conduit 122. Each of the continuous length clamps 152 and 154 is removably mounted on its respective ledges 148 and 150 as by screws 168. As necessary, a gasket material 170 is positioned between each clamp 154 and its supporting ledge 150 to form a vacuum seal therebetween.

Figure 11:
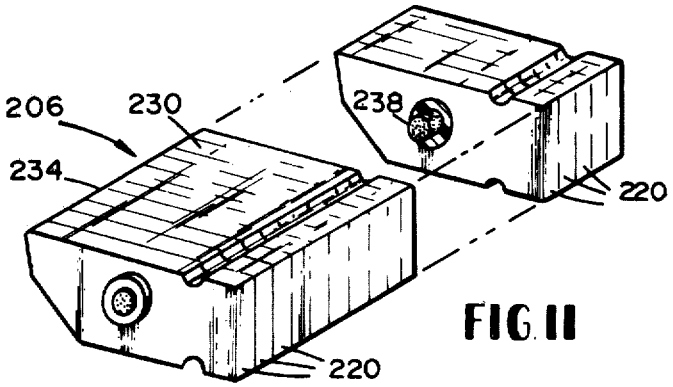
FIG. 11 is a representation of an elongated segmented ceramic doctor blade member embodying various features of the invention.
Figure 12:
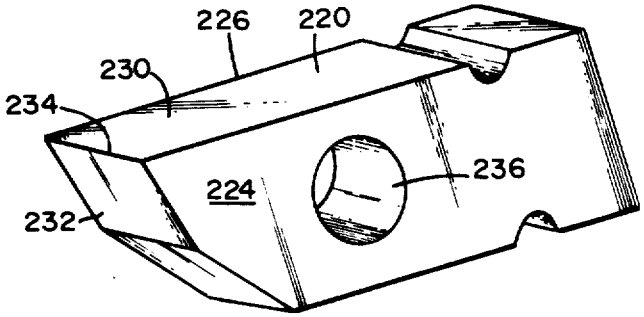
FIG. 12 is a representation of a segment of the member shown in FIG. 11.
Figure 13:
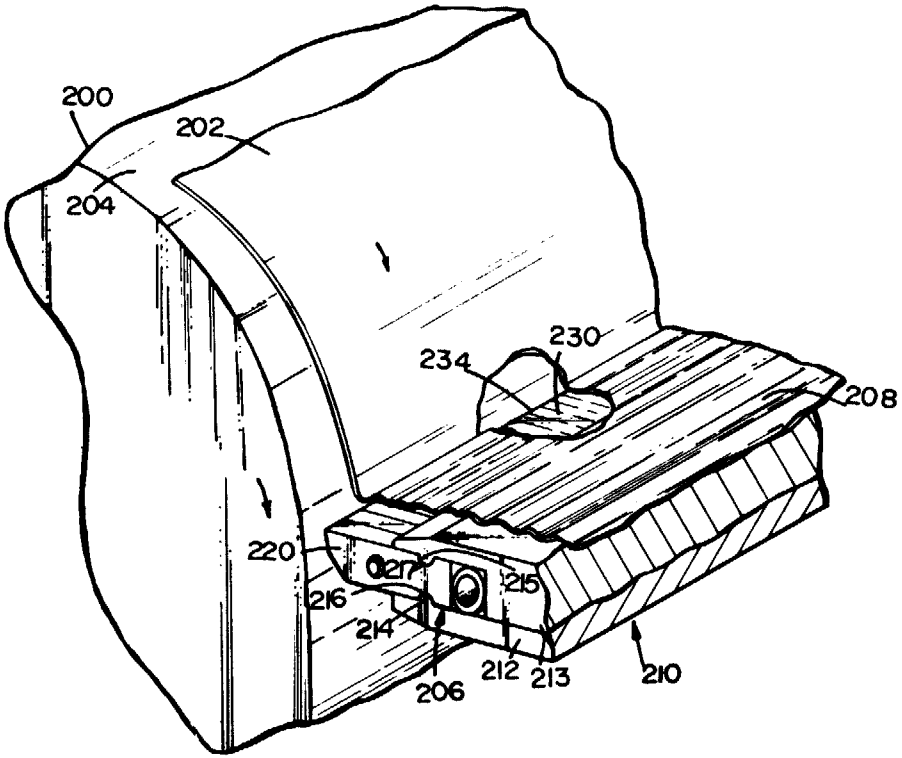
FIG. 13 is a representation of one embodiment of a system including at least two relatively movable members and showing various features of the invention.

One embodiment of a system which includes an elongated flexible ceramic member and which includes at least two members, one of which is movable relative to the other and in frictional engagement therewith is the doctor system depicted in FIGS. 11–13. This depicted system includes Yankee Dryer 200 on which a paper web 202 is dried and creped. The web is trained about a portion of the peripheral surface of the dryer 20 and dried by heat transferred through the cylindrical shell 204 thereof. Steam introduced into the interior of the dryer shell is commonly used to heat the shell. The paper web 202 is doctored from the shell 204 by means of a doctor blade 206 as is well known in the art to provide a creped paper web 208. In this embodiment, the dryer shell 204 comprises a first member of the system and is movable relative to and in frictional engagement with the doctor blade 206 which comprises a second member of the system.

In the system depicted in FIG. 13, the doctor blade 206 is positioned with respect to the dryer surface 204 and to the paper web 202 by support means shown generally at 210 including a pair of jaws 212 and 213 having shoulders 214 and 215, respectively, that engage mating slots 216 and 217 in opposite surfaces of the doctor blade 206. Other suitable mounting means will be readily recognized by one skilled in the art.

In operation of the depicted system, the surface of the shell 204 becomes irregular due to its being heated by the steam. In order to keep the doctor blade in contact with the shell for doctoring the web from the shell, it is necessary to bend the doctor blade so that it conforms to the irregularities in the shell surface.

In these and other systems of this type, as disclosed, it is desired that one of the members be flexible and have a good wear surface that is engaged by the other of the members. It has long been desired that such one of the members be made of a ceramic material to take advantage of the wear resistance of this material. Continuous lengths of ceramic are prohibitively costly. Members having small ceramic inserts disposed along the length of the member to define a wear surface have been tried but such members develop gaps between the inserts where the member bends during use so that the edges and/or corners of the separated segments become points of excessive wear.

The illustrated doctor blade system comprises an elongated flexible member including a plurality of ceramic segments 220 each having at least two opposite substantially parallel flat faces 224 and 226 (FIG. 12). Each of the depicted segments 220 further includes an upper flat surface 230 which joins a forward upright surface 232 to define a leading edge 234, and an opening 236 extending through each segment between its opposite flat surfaces 224 and 226. A plurality of these segments are assembled in face-to-face abutting relationship with their leading edges aligned to define the doctor blade 206. As illustrated, the flat faces 224 and 226 of each segment are disposed substantially perpendicular to the longitudinal axis, i.e. the composite length, of the composite member. The aligned segments 220 are forced toward each other by a tension means 238, anchored to opposite ends of the composite, with a force which elastically compresses the segments.

Each of the segments of each of the elongated members of the present disclosure is fabricated from a hard dense ceramic material that is available at a reasonable cost.

The ceramic preferably is an impervious crystalline material that combines high mechanical strength with extreme hardness, inertness, refractoriness, and high chemical resistance properties. Because these properties are retained over a wide range of application and environmental conditions that many other materials cannot withstand, such ceramics suitably serve under conditons adverse to other materials. Alumina, silicon carbide, boron carbide and silicon nitride materials possess those properties required in many industrial applications, and economically feasible for such end uses. Alumina is particularly suitable and is preferred for use in the present ceramic member because of its properties and its availability at relatively low cost when formed in relatively short segments.

The alumina segment is formed by compacting finely ground oxide powders with fluxing agents and inhibitors at relatively high pressures as is known in the art. Forming methods include dry pressing, isostatic pressing, casting, extrusion, and injection molding. After forming, the resulting "green" ceramic segment is fired at a high temperature for a specific length of time. Firing temperatures vary but usually range between 2,500° F. and 3,250° F. During firing the ceramic shrinks; therefore, segments are formed while in the green state to allow for the physical reduction caused by firing. After firing, the ceramic segment is strong, hard and dense, composed substantially of pure alumina of controlled crystal size. Machining of the ceramic segments is possible either before or after firing. Fired segments are ground or lapped to obtain the desired surfaces thereof. Grinding usually must be done with diamond-impregnated wheels, although silicon-carbide or alumina wheels are sometimes used.

Most of those physical properties desired in the ceramic segments improve as the purity of the ceramic increases, especially hardness, compressive strength, wear resistance and chemical resistance. For example, alumina ceramic compositions having aluminum oxide contents less than about 85% lose certain of their properties to an unacceptable degree. Preferably, the alumina ceramics contain about 90.0 percent or more aluminum oxide.

The compressive strength of the ceramics exceed that for most materials. For example, compressive strengths as high as 550,000 psi have been obtained in certain relatively pure alumina ceramics. Suitable compressive strengths for the ceramic segments range upwardly from about 200,000 psi.

Each of the segments is provided with two opposite substantially flat and parallel faces. The segments are disposed in face-to-face relation with their parallel faces abutting the parallel faces of adjacent segments to define the elongated composite of a desired length and subjected to a compressive force applied at substantially right angles to the faces. The flatness and parallelism of the abutting segment faces help to prevent cracking or breaking of the segments due to unevenly applied stresses or localized stresses by distributing the compressive forces evenly over the abutting faces. Abutting segment faces, each of which is flat to within about 0.0002 inches and has a surface finish of less than about 20 microinches arithmetic average (AA) have been found to be suitable for these purposes. When such individual segments are placed in fact-to-face relation without grout or adhesive, the abutting flat faces of adjacent segments lie in intimate contact with each other over substantially the entire areas of the abutting faces without significant open space therebetween so that the abutting faces supply support to each other especially when the surface of the member is being ground as will be described hereinafter. In one embodiment, each segment is provided with an opening extending between the opposite flat faces thereof. This opening in a segment is aligned with similar openings of abutting segments to provide a channel through the composite for receiving a tension means for compressing the segments in the direction of their composite length.

As noted above, in producing an elongated member of given length, a sufficient number of segments are assembled in face-to-face relation with their respective openings aligned to obtain the desired length. The assembled segments are secured together with a force applied substantially in the direction of the length of the composite and substantially perpendicular to the flat parallel faces of the segments. This force is sufficient to place the segments in elastic compression, and produce a significant compressive strain, and is suitably applied as by a tension means applying a compressive force to opposite ends of the composite. One suitable tension means is a cable inserted through the aligned openings extending between the opposite faces of each of the assembled segments, pulled to the required length, anchored at the opposite ends of the composite as by swage fittings to exert a compressive force upon the composite at its opposite ends. Alternatively, other tensioning means may be used to establish the desired compression of the segments in the composite. One such other means includes a rod disposed in the aligned openings of the segments and fitted with a nut at one or both of its ends so that tightening of the nuts tensions the rod and places the segments in compression. One suitable cable for applying the desired compression force to the segments is made of carbon steel and of the general type employed in prestressed concrete structures.

The cable may be chosen with a cross sectional area less than the cross sectional area of the opening in each segment and after the segment is in place on the cable the space between the cable and the inside surface of the opening in the segment may be filled with a grout 44 (FIG. 2) such as rigid polyurethane, to position the cable within the openings. One suitable grout is a liquid casting urethane polymer designated as LD-2699, sold by E. I. Du Pont de Nemours Company, Trenton, N.J. This grout also accommodates the axial movement of the segments with respect to the compression cable during compression of the composite and/or relative movement between the segments and the cable in the event the member is subjected to thermal change during use.

As illustrated, the composite of segments may be provided with a plate or other means such as a metallic segment at each end of the composite to provide for distribution of the compression force over the face of each end segment to protect it from damage by localized forces. In those instances where the desired compression is relatively great a plurality of tensions means, e.g. cables, provides greater compressive capability. In that event, the plurality of cables are desirably threaded through spaced apart, aligned openings through the segments. Such construction aids in more evenly distributing the compressive forces over the abutting faces of the segments.

Figure 14:
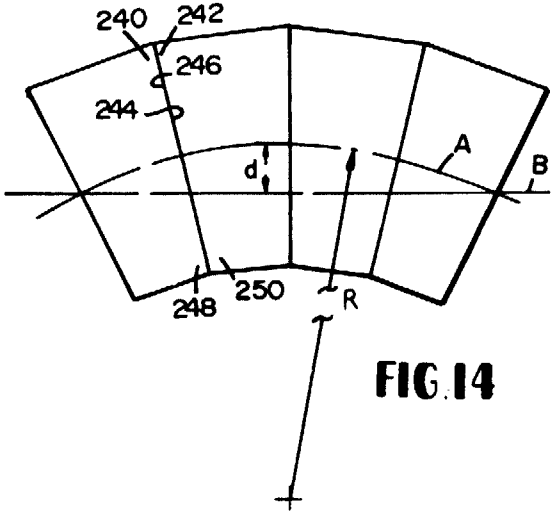
FIG. 14 is a grossly exaggerated representation of a plurality of segments deflected in a manner to aid in explaining certain calculations attending the disclosed invention.
Figure 15:
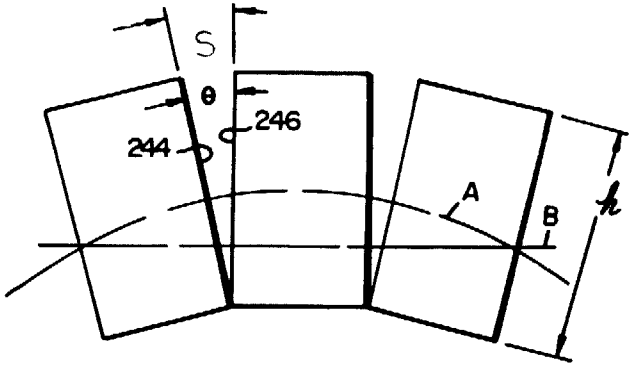
FIG. 15 is a grossly exaggerated representation of a portion of a deflected composite of ceramic segments.

The flexibility of the ceramic member is made possible be employing relatively short segments (e.g. on the order of 1 inch long) held together with a compressive force such that when the elongated composite deflects by a distance d, along its length (see FIGS. 14–15), at least a part of the compression, e.g. compressive strain, in those portions 240 and 242 of the abutting faces 244 and 246 of adjacent segments disposed on the outside of the line of curvature A of the deflected composite is relieved, permitting those portions of the segments to expand to accommodate the deflection without physically separating. Importantly, the compressive force holding the segments together is less than the maximum compressive strength of the ceramic material by an amount which permits those portions 248 and 250 of the abutting faces 244 and 246 of adjacent segments on the inside of the line of curvature A of the deflected composite to be compressed by an additional amount, causing these portions of the segments to compress by an amount sufficient to accommodate the deflection without destruction of the segments. In addition, the length of the individual segments is chosen to be sufficiently small as permits their manufacture at minimized costs taking into consideration the anticipated compressive forces to which the segments are to be subjected in order to obtain the desired response of the composite incident to deflective forces.

In addition to the deflective forces, consideration must be given to thermal changes affecting the element in that such will usually produce different responses in the ceramic segments and the tension member. Such thermal changes can arise by differences in the start-up and operating temperatures of the machine or system in which the element is installed, and/or changes in ambient temperature of the element during assembly, shipping or installation.

In calculating the compression required to accommodate the maximum anticipated deflection of a member of given length without separation of the segments, it is assumed that the deflection of the member will take the shape of a uniformly loaded simple beam and that the maximum deflection will be sufficiently small (less than about 1 percent of the member length) to permit the use of calculations based on circular arcs, rather than more exact curves. The latter could be used in those circumstances where more exact calculations are required; however, it has been found that such is not necessary in constructing flexible members for most end uses. More specifically, and with reference to FIGS. 14 and 15, for a ceramic member of given length, l (in inches), having a longitudinal axis subjected to a maximum anticipated deflection, d (in inches), along a line of curvature A, and made up of a plurality of segments each being of a known [length, L (in inches), and a] dimension, h (in inches), across the segments, in the direction of the applied deflective force and a cross-sectional area, $A_c$, in square inches, the preloading on the tension member, e.g. cable 24 (FIG. 1), which will impart to the ceramic segments the necessary compressive force that precludes separation of the segments is calculated using the equation $$P_D = [(E_cA_c)(8dh/l^2 + 4d^2)/2\ [(L)]] \quad (1)$$

where $E_c$ = the modulus of elasticity of the ceramic;

$A_c$ = the cross-sectional area of a ceramic segment in a plane perpendicular to the composite length of the member, in square inches;

d = the maximum anticipated deflection of the member, in inches;

h = the dimension of a ceramic segment in the plane perpendicular of the composite length of the member and in alignment with the direction of the deflective force, in inches;

l = the overall length of the member. [, and

L = the length of a ceramic segment, in inches]

With reference to Equation (1), it is noted that the initially determined preloading is divided by 2 to give the preloading to be used in tensioning the cable. This fact arises because of the manner in which the ceramic segments are stressed when the member is deflected while under compression. More specifically, assuming the cable is disposed midway between the ends of the segment dimension h, when the member is in an undeflected state, the stress on each compressed ceramic segment is the same at any point along the dimension h. When the member is deflected, the stress in that portion of a segment on the outside of the line of curvature (on the outside end of the dimension h) is reduced toward zero and the stress in that portion of the same segment on the inside of the line of curvature is doubled. Thus when preloading the aligned segments, the stress imparted to the segments is taken as the average of the stresses along the dimension h when the member is deflected by a maximum amount.

The effect of thermal change upon the ceramic member must also be taken into account. Thermal changes occur most frequently by reason of the ceramic member being manufactured at a first temperature, room temperature for example, and thereafter encountering a substantially higher operating temperature. In such circumstances, the strain in the cable decreases when its temperature increases by reason of the cable expanding when heated. Expansion of the cable cross-section as well as along its length is of importance. The ceramic also expands when heated, but usually to a lesser extent than the cable, so that there is added to the preload calculated for deflection in accordance with Equation (1), an additional preloading which will compensate for the effect of thermal change upon the cable and the ceramic and provide the desired preloading for accommodating deflection up to a maximum temperature. Such additional preloading of the tension means is calculated using the equation.

$$P_T = [(\alpha_s - \alpha_c)\Delta T]/[(1/A_sE_s) + (1/A_cE_c)] \quad (2)$$

where:

$\alpha_s$ = the coefficient of thermal expansion of the tension member;

$\alpha_c$ = the coefficient of thermal expansion of the ceramic;

$\Delta T$ = degrees of temperature change anticipated, in degrees F;

$A_s$ = cross-sectional area of the tension member, in square inches;

$E_s$ = the modulus of elasticity of the tension member $A_c$ = the cross-sectional area of a ceramic segment in a plane perpendicular to the length of the member, in square inches;

$E_c$ = the modulus of elasticity of the ceramic.

Combining Equations (1) and (2) gives $$P = [(E_cA_c)(8dh/l^2 + 4d^2)/2\ [(L)]] + [(\alpha_s - \alpha_c)\Delta T]/[(1/A_sE_s) + (1/A_cE_c)] \quad (3)$$

where P is the total preloading of the tension member which will prevent separation of the segments of the member 30 when the member is deflected up to a maximum amount d while at a temperature less than an anticipated maximum temperature it will be noted that in those situations where the ceramic member will not experience a thermal change, $\Delta T$ will be 0 and $P_T$ [including its equivalent expression in Equation (3)] will be 0 and no additional preloading will be required to account for thermal changes.

Thus, in any given situation where the elongated ceramic member is to be subjected to deflection forces, it is possible to select a composite which exhibits the desired non-separation of abutting segment faces when the composite is deflected along its composite length. As shown in Equation (1), the preloading force (compressive force) applied to the aligned segments, for any given maximum anticipated deflection and total length of the segmented member, depends upon the length of each individual segment and the dimension h of each segment. Thus, if the deflection capability of a given composite of ceramic segments is less than that which precludes physical separation of the abutting faces of the segments under the anticipated deflection, an adjustment can be made, in many instances, in either the length or width of the individual segments, or in both the length and width. Of course, consideration must be given to the added compression experienced by those portions of the abutting segment faces disposed on the inside of the line of curvature of the deflected composite.

The preloading force exerted upon the ceramic segments is kept below that amount of force which will compress the ceramic material to within about one-half, and preferably to within about 20 percent, of its maximum compressive strength to insure that localized stresses which may occur within the composite do not exceed such maximum compressive strength with resultant damage to one or more segments. This preferred preloading also provides a substantial margin of safety against damage to the segments by inadvertent overloading of the segments to produce undue deflection. In any event, the preloading of the segments is sufficient to shorten the length of each segment, hence shorten the overall length of the composite. Further, in the preferred preloading, the segments are sufficiently deformed at the interface between abutting segment faces as results in substantial loss of joint identity at such interface. Such deformation is known to occur when the segments are preloaded to between about 15 and 20 percent of the maximum compressive strength of the ceramic. This substantial loss of joint identity has been found to be important in establishing the working surface on the member in that such allows the composite to be ground to a suitable smoothness. Less preloading is acceptable but at a loss of certainty of achieving the desired properties in the composite. Thus, the preloading of the ceramic segments must be sufficient to maintain the segments abutting when the member is deflected by a maximum amount d but less than that preloading which will compress the ceramic to more than one-half its total compressive strength.

It is understood that in the present discussion each of the segments is substantially identical to each other segment in a given composite. Such is assumed for purposes of simplifying the disclosure. It is not required, however, that all of the segments be identical. For example, it may be desirable to provide a segmented member which is deflected by different degrees along its length. In such an embodiment, the deflective characteristics of the member will differ in different portions of its length and the segments in each such portion may differ in length from the segments in other portions of the length of the member.

As disclosed, one of the members of the system is movable with respect to the other member. In many embodiments, one member is held stationary while the other member moves thereover in frictional engagement therewith. Similarly, in many embodiments the stationary member will be the flexible ceramic member and will include a leading edge which is initialy contacted by the moving member as it moves over the ceramic member. In such instances it is important that such leading edge be straight and free of irregularities such as gaps resulting from chipping of the leading edge inasmuch as such irregularities, among other things, hinder or prevent alignment between the two members and create wear points between the moving members.

Figure 3:
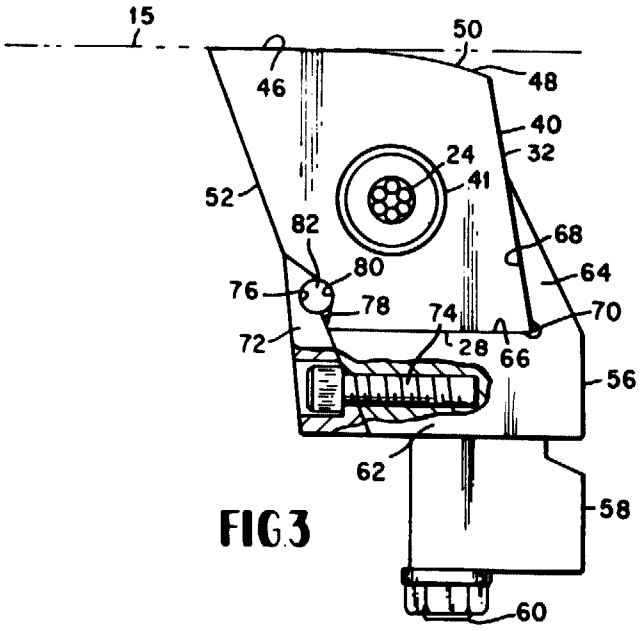
FIG. 3 is an end view, partly cut-away, of the foil shown in FIG. 1.

The segmented ceramic member, being intended for use in a system where it is in frictional engagement with a further member and there is relative movement between the members, is provided with an elongated smooth working surface (surfaces 46, FIG. 3; surfaces 114 and 116, FIG. 6; surface 230, FIG. 11). This surface extends along the length of the ceramic member and defines an extended area of contact between the relatively moving members. Minimum wear of this surface and of the other of the moving members is obtained by maximizing the smoothness of this working surface. This is accomplished by grinding the working surface after the segments have been formed into the composite and preloaded as described hereinabove.

In a typical grinding operation the segmented ceramic member is anchored on the bed of a grinding machine. A diamond impregnated grinding wheel, preferably of the type having an annular planar grinding surface is used in the grinding process. This grinding wheel is moved into contact with the segmented member with the plane of the grinding surface of the grinding wheel disposed at a slight angle with respect to the plane of the surface to be ground so that only a portion of the rotating grinding surface is in contact with the segments at a given time. Preferably the grinding surface plane is also disposed with respect to the working surface so that grinding of the surface takes place as the annular grinding surface moves onto the surface and little or no grinding takes place as the grinding surface is moving away from the surface being ground.

The rotation of the grinding wheel, when grinding a leading edge of the type shown in FIG. 1, is such that the grinding surface initially contacts the leading edge, e.g. edge 13 of FIG. 1, as the grinding surface moves toward the edge. In this manner, the grinding forces exerted upon the segments are directed inwardly of the segments to aid in preventing chipping of the segments edges during grinding. Preferably, the grinding action at the leading edge is in a direction substantially perpendicular to the leading edge. Variations of greater than about 10° from such perpendicular relationship may provide relatively poor edges.

In the grinding operation the compression of the segments in the direction of their composite length maintains the edges of abutting segments in supporting relationship to each other. In addition to this physical support of one segment by its neighbor, the compression in the segments is sufficient to prevent the force of the grinding operation from placing the segment edges in tension as the grinding wheel drags across the segment, thereby enhancing the resistance of the segments to edge chipping during grinding.

EXAMPLE I

The manufacture of a doctor blade is described hereinafter as illustrative of the manufacture of the disclosed composite ceramic members of the systems described herein. Doctor blades for doctoring a paper web from the surface of a cylindrical dryer shell normally are deflected by different amounts along different portions of their length due to undulations in the dryer shell across its width. In making a ceramic composite doctor blade the most severe anticipated deflection is chosen and the total deflection capability of the blade is made sufficient to accommodate such. In this Example the length, l, of the chosen deflected portion is 50 inches.

The doctor blade in the configuration illustrated in FIG. 1 is made from 1 inch long [(L)] alumina segments (AD-995 from Coors Porcelain Co.) each having a cross-sectional area ($A_c$) of 0.78 square inches. The dimension (h), the dimension in the direction of the application of the deflective forces, is 0.875 inch. These segments are aligned with their flat parallel faces abutting and compressed in the direction of their composite length by a stainless steel cable of 0.14 square inches cross-sectional area threaded through aligned openings in the segments.

The maximum anticipated deflection of the doctor blade over the chosen 50 inch length, l, is determined to be 0.027 inch and the anticipated thermal change is from 70° F to 300° F. ($\Delta T = 230°$ F). The preloading for the cable which passes through the segments is calculated using Equation (3) as follows:

$$P = \frac{E_c A_c \frac{8dh}{p + 4d^2} [(L)]}{2} + \frac{(\alpha_s - \alpha_c)\Delta T}{\frac{1}{A_s E_s} + \frac{1}{A_c E_c}}$$

$$P = \frac{(54 \times 10^6)(0.78)\frac{8(0.027)(0.875)}{(50)^2 + 4(0.027)^2}[(1)]}{2} + \frac{[(6.3 \times 10^{-6}) - (3.5 \times 10^{-6})]\,230}{\frac{1}{(0.16)(29 \times 10^6)} + \frac{1}{(0.78)(54 \times 10^6)}}$$

P = 1579.5 + 2385.19
P = 3964.69 pounds

This preloading imparted a compressive force to the ceramic which is about 1.54 percent of the 330,000 psi approximate maximum compressive strength for AD-995 alumina. This degree of compression provides for the anticipated deflection, occurring at a temperature of 300° F., without complete relief of the compression in those portions of the abutting segment faces furtherest from the longitudinal axis of the member along which the deflection occurs and, importantly, provides for additional compression of those portions of the abutting segment faces nearest the longitudinal axis of the member as necessary to accommodate the deflection.

The working surface 230 of the segmented member 222 is ground while the member is supported along its entire length on the bed of a grinding machine. A 220-grit diamond impregnated wheel, having an annular grinding surface, as sold by the Norton Company is employed in the grinding operation. The grinding wheel has a diameter of 10 inches, and is rotated at approximately 3,600 revolutions per minutes. The wheel is moved along the length of the working surface at a speed between about 10 and 20 feet per minute. The position of the grinding wheel relative to the working surface and its rotational movement is as described above. The grinding operation provides a surface finish of about 20 microinches (AA) with no significant chipping of the leading edge 234.

EXAMPLE II

Another system of the type disclosed herein comprises a foil and a forming fabric of a Fourdrinier papermaking machine. In this system, the elongated foil is disposed beneath the forming fabric and serves to support the fabric and remove water from a slurry of papermaking fibers carried on the fabric. In these functions, the fabric slides over the foil while it is pulled against the foil by suction developed by the foil. There is substantial wear of both the foil and the wire in these systems as known heretofore.

A 200-inch long foil for use in a Fourdrinier papermaking machine is made from 200 1 inch long AD-995 alumina segments held in compression by a 0.677 inch diameter stainless steel cable which is passed through an opening located centrally of each segment. Each segment has a cross-sectional area ($A_c$) of 2 square inches, and a dimension (h) of 2 inches. The maximum anticipated deflection of the foil is 0.5 inch and the anticipated thermal change is from 70° F. to 170° F ($\Delta T$ = 100° F).

Using Equation (3), the preloading for the cable for preventing separation of the segments under such conditions is calcuated as follows:

$$P = \frac{(54 \times 10^6)(2)\frac{(8)(0.5)(2)}{200^2 + (4)(0.5)^2}[(1)]}{2} + \frac{[(6.3 \times 10^6) - (3.5 \times 10^6)](100)}{\frac{1}{(0.36)(29 \times 10^6)} + \frac{1}{(2)(54 \times 10^6)}}$$

P = 10,746 + 3,557.8
P = 14,304 pounds

The preload force in this example stresses the ceramic to 2.17 percent of its maximum compressive strength.

This foil is provided with a ground elongated working surface having a smoothness of less than about 20 microinches AA in the manner disclosed herein. In use, the foil exhibits excellent wear qualities and does not exhibit gaps between abutting segment faces. Foils of this type when used in a high speed Fourdrinier papermaking machine do not produce streaks in the paper web formed on the forming fabric moving over the foil, as has been experienced by the prior art segmented foils which develop gaps between abutting segments.

EXAMPLE III

A further system of the type disclosed herein comprises a suction device for use in a papermaking machine known as a Uhle Box. This suction device comprises an elongated trough-like device having an elongated slot extending along its length and opening toward a forming fabric or felt moving thereacross. A suction is developed within the Uhle Box so that the fabric or felt is pulled against the edges of the slot and water or other material is pulled from the fabric or felt into the Uhle Box. The edges of the slot are subjected to relatively greater wear forces and the Uhle Box, hence the slot edges, are subjected to substantial deflective forces as the fabric or felt moves across the device in a direction transverse to its length.

A Uhle Box having each of its slot edges made of a flexible ceramic member may be fabricated using the teachings of the invention as follows. Each such slot edge is 200 inches long and made of 1 inch long AD-995 alumina segments held in compression by a stainless steel cable having a cross sectional area of 0.25 square inches which is disposed in aligned openings in the segments. Each segment has a cross-sectional area ($A_c$) of 0.92 square inch and a dimension of (h) of 1.250 inches.

In calculating the preload for the cable, the maximum anticipated deflection is 3 inches and the maximum temperature anticipated during use is 170° F. The temperature at assembly is 70° F, giving a $\Delta T$ of 100° F. Using Equation (3) the preload is determined as follows:

$$P = \frac{(54 \times 10^6)(0.92)\frac{(8)(3)(1.250)}{(200)^2 + (4)(3)^2}[(1)]}{2} + \frac{[(6.3 \times 10^6) - (3.5 \times 10^6)]100}{\frac{1}{(0.25)(29 \times 10^6)} + \frac{1}{(0.92)(54 \times 10^6)}}$$

P = 18,605 + 1,771.5
P = 20,376.5 pounds

The preload force in this Example stresses the ceramic to 6.71 percent of its maximum compressive strength.

In addition to the advantages of flexibility and resistance to gaping between segments, the present ceramic member offers the advantage of providing a wear-resistance surface that can be ground smooth to the extent desired. Because the abutting faces of the ceramic segments are held in exceptionally close contact with each other, when the combined top surfaces of the segments are ground smooth, their edges support each other to prevent chipping of their adjacent edges so that in the finished surface, even though the dividing line between segments may be visible as a "hair line" crack, there is no substantial opening or gap therebetween. The wear surface of the disclosed ceramic member is ground and/or lapped smooth to less than about 20 microinches AA and preferably to within a few wavelengths of light to provide exeptionally low-friction contact between the relatively moving members of the system. In this manner, the useful lives of both members are prolonged.

While preferred embodiments have been shown and described, it will be understood that there is no intent to limit the invention by such disclosure, but rather, it is intended to cover all modifications and alternate constructions falling within the spirit and scope of the invention as defined in the appended claims.

What is claimed is:

1. In a papermaking system including at least two members one of which is movable relative to the other and in frictional engagement therewith, and in which system at least one of said members is subjected to deflection, the improvement wherein said latter member comprises an elongated flexible assemblage including a plurality of ceramic segments, each having at least two opposite surfaces that are substantially flat and parallel, said segments being aligned with their flat faces in abutting face-to-face relation and in respective planes that are oriented substantially perpendicular to the composite length of said plurality of segements, tension means extending between opposite ends of said assemblage and forcing said segments toward each other in a direction along their composite length and substantially perpendicular to their respective parallel faces with a preload force on said tension means, when said latter member is in an undeflected condition, that is at least the force calculated by the equation:

$$P = [(E_cA_c)(8dh/l^2 + 4d^2)/2\ [(L)]] + [(\alpha_s - \alpha_c)\Delta T]/[1/A_sE_s) + (1/A_cE_c)]$$

where:

P is the preload of said tension means, in pounds;

$E_c$ is the modulus of elasticity of the ceramic material;

$A_c$ is the cross-sectional area of a ceramic segment in a plane perpendicular to the composite length of said assemblage, in square inches;

d is the maximum anticipated deflection of said assemblage, in inches, h is the dimension of a ceramic segment in the plane perpendicular to the composite length of said assemblage and in alignment with the direction of said deflective force, in inches;

l is the overall length of said assemblage;

$\alpha_s$ is the coefficient of thermal expansion of said tension means;

$\alpha_c$ is the coefficient of thermal expansion of said ceramic;

$\Delta T$ is the degrees of temperature change anticipated, in degrees F.;

$A_s$ is the cross-sectional area of said tension means;

$E_s$ is the modulus of elasticity of said tension means, [and

L is the length of a ceramic segment, in inches,]

but less than the amount of force which will compress said ceramic to over about one-half of its maximum compressive strength, an elongated smooth working surface extending along the length of said latter member and defining an area of contact with said other member, and means supporting said latter member relative to said other member with its longitudinal dimension oriented generally transversely of the direction of relative movement of said members whereby loading forces exerted upon said latter member are directed thereagainst in a direction substantially perpendicular to the longitudinal dimension thereof and deflection of said latter member pursuant to such loading forces is compensated for in said compressed segments by further compression of said segments in those portions of the abutting faces thereof disposed along the inside of the line of curvature of said latter member and by relief of less than all of the compression in those portions of said abutting faces that are disposed along the outside of said line of curvature of said member without physical separation of said segments at their abutting faces.

2. The system of claim 1 wherein said preload force does not exceed a force which will compress said ceramic to greater than about 20 percent of its maximum compressive strength.

3. The system of claim 1 wherein said working surface on said latter member includes a substantially straight and continuous leading edge that is in initial contact with said other member.

4. The system of claim 1 wherein said tension means forcing said segments toward each other is a nonceramic material.

5. The system of claim 1 wherein said ceramic comprises alumina.

6. The system of claim 1 wherein said alumina has a purity of greater than about 85 percent.

7. The system of claim 1 wherein said ceramic segments are substantially identical and each has an opening extending between its opposite flat and parallel surfaces, said openings in said segments being in register and said tension means extending therethrough.

8. The system of claim 1 wherein each of the abutting flat faces of said ceramic segments is flat to within about 0.0002 inches.

9. The system of claim 1 wherein said elongated smooth working surface has a surface smoothness of less than about 20 microinches AA.

10. In a papermaking machine including a moving wire on which a paper web is formed, an improved foil disposed on the bottom side of said wire in frictional engagement therewith comprising an elongated flexible assemblage including a plurality of ceramic segments, each having at least two opposite surfaces that are substantially flat and parallel, said segments being aligned with their flat faces in abutting face-to-face relation and in respective planes that are oriented substantially perpendicular to the composite length of said plurality of segments, tension means extending between opposite ends of said assemblage and forcing said segments toward each other in a direction along their composite length and substantially perpendicular to their respective parallel faces with a preload force on said tension means, when said assemblage is in an undeflected condition, that is at least the force calculated by the equation:

$$P = [(E_cA_c)(8dh/l^2 + 4d^2)/2\ [(L)]] + [(\alpha_s - \alpha_c)\Delta T]/[(1/A_sE_s) + (1/A_cE_c)]$$

where:

P is the preload of said tension means, in pounds;

$E_c$ is the modulus of elasticity of the ceramic material;

$A_c$ is the cross-sectional area of a ceramic segment in a plane perpendicular to the composite length of said assemblage, in square inches;

d is the maximum anticipated deflection of said assemblage, in inches;

h is the dimension of a ceramic segment in the plane perpendicular to the composite length of said assemblage and in alignment with the direction of said deflective force, in inches;

l is the overall length of said assemblage;

$\alpha_s$ is the coefficient of thermal expansion of said tension means;

$\alpha_c$ is the coefficient of thermal expansion of said ceramic;

$\Delta T$ is the degree of temperature change anticipated, in degrees F.;

$A_s$ is the cross-sectional area of said tension means;

$E_s$ is the modulus of elasticity of said tension means, [and

L is the length of the ceramic segment, in inches,]

but less than the amount of force which will compress said ceramic to over about one-half of its maximum compressive strength, an elongated smooth working surface extending along the length of said elongated assemblage and defining an area of contact with said moving wire, and means supporting said elongated assemblage on the bottom side of said moving wire and in frictional engagement therewith with the longitudinal dimension of said assemblage oriented generally transversely of the direction of movement of said wire whereby loading forces exerted upon said assemblage are directed thereagainst in a direction substantially perpendicular to the longitudinal dimension thereof and deflection of said foil pursuant to such loading forces is compensated for in said compressed segments by further compression of said segments in those portions of the abutting faces thereof disposed along the inside of the line of curvature of said assemblage without physical separation of said segments at their abutting faces.

11. In a papermaking machine including a moving fabric having a forward direction of motion, an improved elongated drainage device oriented transversely of the forward direction of said fabric in supporting contact therewith including a suction chamber and means defining a slot along that side of said suction chamber adjacent said fabric, said slot having closed ends and opposite side edges and extending along the length of said device and being in fluid communication with said fabric for the application of suction to that side of said fabric adjacent said slot, the improvement comprising an elongated flexible assemblage disposed on each of said side edges of said slot, including a plurality of ceramic segments, each having at least two opposite surfaces that are substantially flat and parallel, said segments being aligned with their flat faces in abutting face-to-face relation and in respective planes that are oriented substantially perpendicular to the composite length of said plurality of segments, tension means extending between opposite ends of said assemblage and forcing said segments toward each other in a direction along their composite length and substantially perpendicular to their respective parallel faces with a preload force on said tension means, when said latter member is in an undeflected condition, that is at least the force calculated by the equation:

$$P = [(E_cA_c)(8dh/l^2 + 4d^2)/2\ [(L)]] + [(\alpha_s - \alpha_c)\Delta T]/[(1/A_sE_s) + (1/A_cE_c)]$$

where:

P is the preload of said tension means, in pounds;

$E_c$ is the modulus of elasticity of the ceramic material;

$A_c$ is the cross-sectional area of a ceramic segment in a plane perpendicular to the composite length of said assemblage, in square inches;

d is the maximum anticipated deflection of said assemblage, in inches;

h is the dimension of a ceramic segment in the plane perpendicular to the composite length of said assemblage and in alignment with the direction of said deflective force, in inches;

l is the overall length of said assemblage;

$\alpha_s$ is the coefficient of thermal expansion of said tension means;

$\alpha_c$ is the coefficient of thermal expansion of said ceramic;

$\Delta T$ is the degree of temperature change anticipated, in degrees F.;

$A_s$ is the cross-sectional area of said tension means;

$E_s$ is the modulus of elasticity of said tension means, [and

L is the length of a ceramic segment, in inches,]

but less than the amount of force which will compress said ceramic to over about one-half of its maximum compressive strength, an elongated smooth working surface extending along the length of said assemblage and defining an area of contact with said fabric, and means supporting said drainage device relative to said fabric with its longitudinal dimension oriented generally transversely of the direction of relative movement of said fabric whereby loading forces exerted upon said drainage device are directed thereagainst in a direction substantially perpendicular to the longitudinal dimension thereof and deflection of said assemblage pursuant to such loading forces is compensated for in said compressed segments by further compression of said segments in those portions of the abutting faces thereof disposed along the inside of the line of curvature of said assemblage and by relief of less than all of the compression in those portions of said abutting faces that are disposed along the outside of said line of curvature of said assemblage without physical separation of said segments at their abutting faces.

12. The drainage device of claim 11 wherein said means supporting said assemblage relative to said fabric comprises an elongated cradle means receiving said assemblage of ceramic segments in substantially fluid tight relation therewith.

13. In a papermaking system including a rotating cylindrical member carrying a paper web on the outer cylindrical surface thereof and an elongated doctor blade disposed adjacent said surface for removing said web from said surface the improvement comprising an elongated flexible assemblage including a plurality of ceramic segments, each having at least two opposite surfaces that are substantially flat and parallel, said segments being aligned with their flat faces in abutting face-to-face relation and in respective planes that are oriented substantially perpendicular to the composite length of said plurality of segments, tension means extending between opposite ends of said assemblage and forcing said segments toward each other in a direction along their composite length and substantially perpendicular to their respective parallel faces with a preload force on said tension means, when said assemblage is in an undeflected condition, that is at least the force calculated by the equation:

$$P = [(E_cA_c)(8dh/l^2 + 4d^2)/2 \text{ [}(L)\text{]}] + [(\alpha_s - \alpha_c)\Delta T]/[1/A_sE_s) + (1/A_cE_c)]$$

where:

P is the preload of said tension means, in pounds;

$E_c$ is the modulus of elasticity of the ceramic material;

$A_c$ is the cross-sectional area of a ceramic segment in a plane perpendicular to the composite length of said assemblage, in square inches;

d is the maximum anticipated deflection of said assemblage, in inches;

h is the dimension of a ceramic segment in the plane perpendicular to the composite length of said assemblage and in alignment with the direction of said deflective force, in inches;

l is the overall length of said assemblage;

$\alpha_s$ is the coefficient of thermal expansion of said tension means;

$\alpha_c$ is the coefficient of thermal expansion of said ceramic;

$\Delta T$ is the degree of temperature change anticipated, in degrees F.;

$A_s$ is the cross-sectional area of said tension means;

$E_s$ is the modulus of elasticity of said tension means, [and

L is the length of a ceramic segment, in inches,]

but less than the amount of force which will compress said ceramic to over about one-half of its maximum compressive strength, an elongated smooth working surface extending along the length of said doctor blade and defining an elongated area of contact with said cylindrical surface, and means supporting said doctor blade relative to said cylindrical surface with the longitudinal dimension of said doctor blade oriented generally transversely of the direction of rotational movement of said cylindrical member whereby loading forces exerted upon said doctor blade are directed thereagainst in a direction substantially perpendicular to the longitudinal dimension thereof and deflection of said doctor blade pursuant to such loading forces is compensated for in said compressed segments by further compression of said segments in those portions of the abutting faces thereof disposed along the inside of the line of curvature of said assemblage and by relief of less than all of the compression in those portions of said abutting faces that are disposed along the outside of said line of curvature of said assemblage without physical separation of said segments at their abutting faces.

* * * * *

UNITED STATES PATENT OFFICE
CERTIFICATE OF CORRECTION

Patent No. Re-29,417 Dated September 27, 1977

Inventor(s) Charles A. Lee and Robert F. Hunt

It is certified that error appears in the above-identified patent and that said Letters Patent are hereby corrected as shown below:

Col. 1, line 15, after 377,893, insert -- July --.

Col. 2, line 66, "to" should be -- be --.

Col. 4, line 20, "between" should be -- become --.

Col. 17, line 42, "initialy" should be -- initially --.

Col. 19, line 5, the equation should read as follows:

$$P = \frac{E_C A_C \frac{8dh}{l^2 + 4d^2} [(L)]}{2} + \frac{(a_S - a_C)\Delta T}{\frac{1}{A_S E_S} + \frac{1}{A_C E_C}}$$

(This is only the first section of the equation, the error being located in the first part of this section).

Col. 19, line 35, "minutes" should be -- minute --.

Signed and Sealed this

Eighteenth Day of April 1978

[SEAL]

Attest:

RUTH C. MASON
Attesting Officer

LUTRELLE F. PARKER
Acting Commissioner of Patents and Trademarks